US006323751B1

(12) United States Patent
Duggal et al.

(10) Patent No.: US 6,323,751 B1
(45) Date of Patent: Nov. 27, 2001

(54) CURRENT LIMITER DEVICE WITH AN ELECTRICALLY CONDUCTIVE COMPOSITE MATERIAL AND METHOD OF MANUFACTURING

(75) Inventors: Anil Raj Duggal; Minyoung Lee, both of Niskayuna; Lionel Monty Levinson, Schenectady, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/443,753

(22) Filed: Nov. 19, 1999

(51) Int. Cl.[7] .................................................. A01K 7/10

(52) U.S. Cl. ......................... 338/22 R; 338/99; 338/101; 338/47

(58) Field of Search .................................... 338/22 R, 20, 338/99, 101, 47, 113

(56) References Cited

U.S. PATENT DOCUMENTS

| | | |
|---|---|---|
| 2,870,307 | 1/1959 | Milliken et al. . |
| 3,226,600 | 12/1965 | Zielasek et al. . |
| 3,243,753 | 3/1966 | Kohler . |
| 3,648,002 | 3/1972 | Du Rocher . |
| 3,673,121 | 6/1972 | Meyer . |
| 4,017,715 | 4/1977 | Whitney et al. . |
| 4,101,862 | 7/1978 | Takag et al. . |
| 4,104,509 | 8/1978 | Van Bokestal et al. . |
| 4,107,640 | 8/1978 | Asano et al. . |
| 4,237,441 | 12/1980 | Van Konynenburg et al. . |
| 4,292,261 | 9/1981 | Kotani et al. . |
| 4,304,987 | 12/1981 | Van Konynenburg . |
| 4,317,027 | 2/1982 | Middleman et al. . |
| 4,327,282 | 4/1982 | Nauerth . |
| 4,583,146 | 4/1986 | Howell . |
| 4,685,025 | 8/1987 | Carlomagno . |
| 4,890,186 | 12/1989 | Matsubara et al. . |
| 5,057,674 | 10/1991 | Smith-Johannsen . |
| 5,068,634 | 11/1991 | Shrier . |
| 5,140,297 | 8/1992 | Jacobs et al. . |
| 5,166,658 | 11/1992 | Fang et al. . |
| 5,247,276 | 9/1993 | Yamazaki . |

(List continued on next page.)

FOREIGN PATENT DOCUMENTS

| | | |
|---|---|---|
| 4330607A1 | 3/1995 | (DE) . |
| 0 576 836 A2 | 5/1993 | (EP) . |
| 0 576 836 A3 | 5/1993 | (EP) . |
| 0 640 995A1 | 3/1995 | (EP) . |
| 0713227A1 | 5/1996 | (EP) . |
| 0747910A2 | 12/1996 | (EP) . |
| 63313805 | 12/1988 | (JP) . |
| WO 91/12643 | 8/1991 | (WO) . |
| WO 91/19297 | 12/1991 | (WO) . |
| WO 93/21677 | 10/1993 | (WO) . |
| WO 94/10734 | 5/1994 | (WO) . |
| WO 95/07540 | 3/1995 | (WO) . |
| WO 95/34931 | 12/1995 | (WO) . |
| WO 97/49102 | 12/1997 | (WO) . |

*Primary Examiner*—Karl D. Easthom
(74) *Attorney, Agent, or Firm*—Toan P. Vo; Noreen C. Johnson

(57) ABSTRACT

A current limiter device comprises at least two electrodes; an interlocked-array electrically conductive composite material disposed between the electrodes; interfaces disposed between the electrodes; an inhomogeneous distribution of resistance at the interfaces whereby, during a high current event, adiabatic resistive heating at the interfaces causes rapid thermal expansion and vaporization and physical separation at the interfaces; and means for exerting compressive pressure on the electrically conducting composite material. The interlocked-array electrically conductive composite material comprises an interlocked-array of spaced apart discrete regions of at least one insulating flexible material and at least one electrically conductive composite material. A method for forming the interlocked-array electrically conductive composite material structure is also set forth by the invention.

19 Claims, 6 Drawing Sheets

U.S. PATENT DOCUMENTS

| | | |
|---|---|---|
| 5,260,848 | 11/1993 | Childers . |
| 5,313,184 | 5/1994 | Greuter et al. . |
| 5,382,938 | 1/1995 | Hansson et al. . |
| 5,414,403 | 5/1995 | Greuter et al. . |
| 5,416,462 | 5/1995 | Demarmels et al. . |
| 5,432,140 | 7/1995 | Sumpter et al. . |
| 5,436,274 | 7/1995 | Sumpter et al. . |
| 5,451,919 | 9/1995 | Chu et al. . |
| 5,581,192 | 12/1996 | Shea et al. . |
| 5,602,520 | 2/1997 | Baiatu et al. . |
| 5,614,881 | 3/1997 | Duggal et al. . |
| 5,644,283 | 7/1997 | Grosse-Wilde et al. . |
| 5,742,223 | 4/1998 | Simendinger, III et al. . |

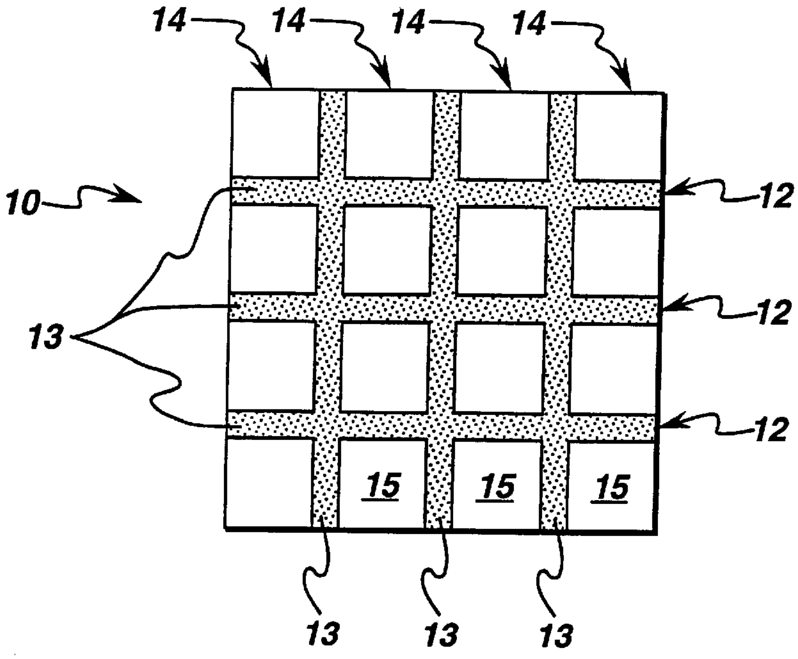
fig. 3
fig. 4
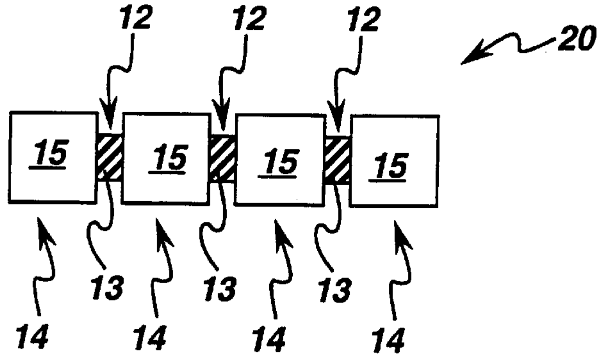
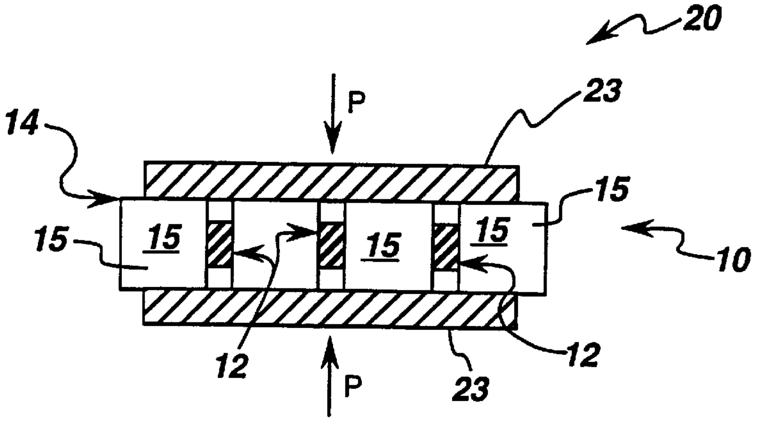
fig. 5

CURRENT LIMITER DEVICE WITH AN ELECTRICALLY CONDUCTIVE COMPOSITE MATERIAL AND METHOD OF MANUFACTURING

CROSS REFERENCE TO RELATED APPLICATIONS

This invention is related to U.S. Ser. No. 08/925,011, which was filed Aug. 28, 1997, the entire contents of which are incorporated by reference herein.

BACKGROUND OF THE INVENTION

This invention relates to current limiter devices for general circuit protection including electrical distribution and motor control applications. In particular, the invention relates to current limiter devices that are capable of limiting the current in a circuit when a high current event or high current condition occurs.

There are numerous devices that are capable of limiting the current in a circuit when a high current condition occurs. One known limiting device includes a filled polymer material that exhibits what is commonly referred to as a PTCR (positive-temperature coefficient of resistance) or PTC effect. U.S. Pat. No. 5,382,938, U.S. Pat. No. 5,313,184, and European Published Patent Application No. 0,640,995 A1 each describes electrical devices relying on PTC behavior. The unique attribute of the PTCR or PTC effect is that at a certain switch temperature the PTCR material undergoes a transformation from a basically conductive material to a basically resistive material. In some of these prior current limiter devices, the PTCR material (typically polyethylene loaded with carbon black) is placed between pressure contact electrodes.

U.S. Pat. No. 5,614,881, to Duggal et al., issued Mar. 25, 1997, the entire contents of which are herein incorporated by reference, discloses a current limiter device. This current limiter device relies on a composite material and an inhomogeneous distribution of resistance structure.

Current limiter devices are used in many applications to protect sensitive components in an electrical circuit from high fault currents. Applications range from low voltage and low current electrical circuits to high voltage and high current electrical distribution systems. An important requirement for many applications is a fast current limiting response time, alternately known as switching time, to minimize the peak fault current that develops.

In operation, current limiter devices are placed in a circuit to be protected. Under normal circuit conditions, the current limiter device is in a highly conducting state. When a high current condition occurs, the PTCR material heats up through resistive heating until the temperature is above the "switch temperature." At this point, the PTCR material resistance changes to a high resistance state and the high current condition current is limited. When the high current condition is cleared, the current limiter device cools down over a time period, which may be a long time period, to below the switch temperature and returns to the highly conducting state. In the highly conducting state, the current limiter device is again capable of switching to the high resistance state in response to future high current condition events.

Known current limiter devices comprise electrodes, electrically conductive composite material, a low pyrolysis or vaporization temperature polymeric binder and electrically conducting filler, combined with an inhomogeneous distribution of resistance structure. The switching action of these current limiter devices occurs when joule heating of the electrically conducting filler in the relatively higher resistance part of the composite material causes sufficient heating to cause pyrolysis or vaporization of the binder. During operation of known current limiter devices, at least one of material ablation and arcing occur at localized switching regions in the inhomogeneous distribution of resistance structure. The ablation and arcing can lead to at least one of high mechanical stresses, which are often in the form of moment mechanical stresses, subjected on the conductive composite material. These high mechanical stresses often lead to the mechanical failure of the composite material.

Therefore, electrically conductive composite materials and their configurations for use in current limiter devices should possess desirable and constant consistent, predictable, or reproducible properties. These properties are suitable for high current multiple use current polymer limiting devices that avoid a build up of undesirable high moment mechanical stresses.

SUMMARY OF THE INVENTION

The invention sets forth a current limiter device comprises at least two electrodes; an interlocked-array electrically conductive composite material structure disposed between the electrodes; interfaces disposed between the electrodes; an inhomogeneous distribution of resistance at the interfaces whereby, during a high current event, adiabatic resistive heating at the interfaces causes rapid thermal expansion and vaporization and physical separation at the interfaces; and means for exerting compressive pressure on the electrically conducting composite material structure. The interlocked-array electrically conductive composite material structure comprises an interlocked-array of spaced apart discrete regions comprising at least one insulating flexible material and at least one electrically conductive composite material.

The invention further provides an electrically conducting composite material structure comprising an interlocked-array electrically conductive composite material structure. The interlocked-array electrically conductive composite material structure comprises an interlocked-array of spaced apart discrete regions of at least one insulating flexible material and at least one composite material.

A further aspect of the invention sets forth a method of current limiter device, in which the current limiter device comprises at least two electrodes; an interlocked-array electrically conductive composite material structure disposed between the electrodes; interfaces between the electrodes and interlocked-array electrically conductive composite material structure; an inhomogeneous distribution of resistance at the interfaces whereby, during a high current event, adiabatic resistive heating at the interfaces causes rapid thermal expansion and vaporization and physical separation at the interfaces; and means for exerting compressive pressure on the interlocked-array electrically conductive composite material structure. The interlocked-array electrically conductive composite material structure comprises an interlocked-array of spaced apart discrete regions of at least one insulating flexible material and at least one composite material. The method comprises manufacturing the interlocked-array electrically conductive composite material structure comprising an interlocked-array of spaced apart discrete regions of at least one insulating flexible material and at least one composite material. The manufacturing of the interlocked-array electrically conductive composite material structure comprises providing a relatively inflexible electrically conductive composite material; forming at least one depression in the relatively inflexible electrical conductive composite material; providing an uncured insulating flexible material; depositing the uncured insulating flexible material in the at least one depression in the relatively inflexible electrically conductive composite material; and curing the insulating flexible material to form the an interlocked-array of spaced apart discrete regions of at least one insulating flexible material and at least one composite material. The remainder of the current limiting method comprises providing the at least two electrodes; and providing the an interlocked-array of spaced apart discrete regions of at least one insulating flexible material and at least one composite material between the at least two electrodes and placing the at least two electrodes and an interlocked-array of spaced apart discrete regions of at least one insulating flexible material and at least one composite material under pressure from the exerting means.

These and other advantages and salient features of the invention will become apparent from the following detailed description, which, when taken in conjunction with the annexed drawings, disclose embodiments of the invention.

BRIEF DESCRIPTION OF THE DRAWINGS

While the novel features of this invention are set forth in the following description, the invention will now be described from the following description of the invention taken in conjunction with the drawings, in which:

FIG. 3 is a top perspective view of a composite material structure for a current limiter device, as embodied by the invention;

FIG. 4 is a partial side sectional view of a composite material structure for a current limiter device, as embodied by the invention;

FIG. 5 is a partial side sectional view of a current limiter device with a composite material, as embodied by the invention;

DETAILED DESCRIPTION OF THE INVENTION

A current limiter device, as described in U.S. Pat. No. 5,614,881 to Duggal et al, which is fully incorporated herein by reference, comprises an electrically conductive composite material positioned between electrodes, so that there is an inhomogeneous distribution of resistance throughout the current limiter device. The electrically conductive composite material comprises at least a conductive filler and an organic binder. The current limiter device in U.S. Pat. No. 5,614,881 further comprises means for exerting compressive pressure on the electrically conductive composite material of the current limiter device.

Figure 1:
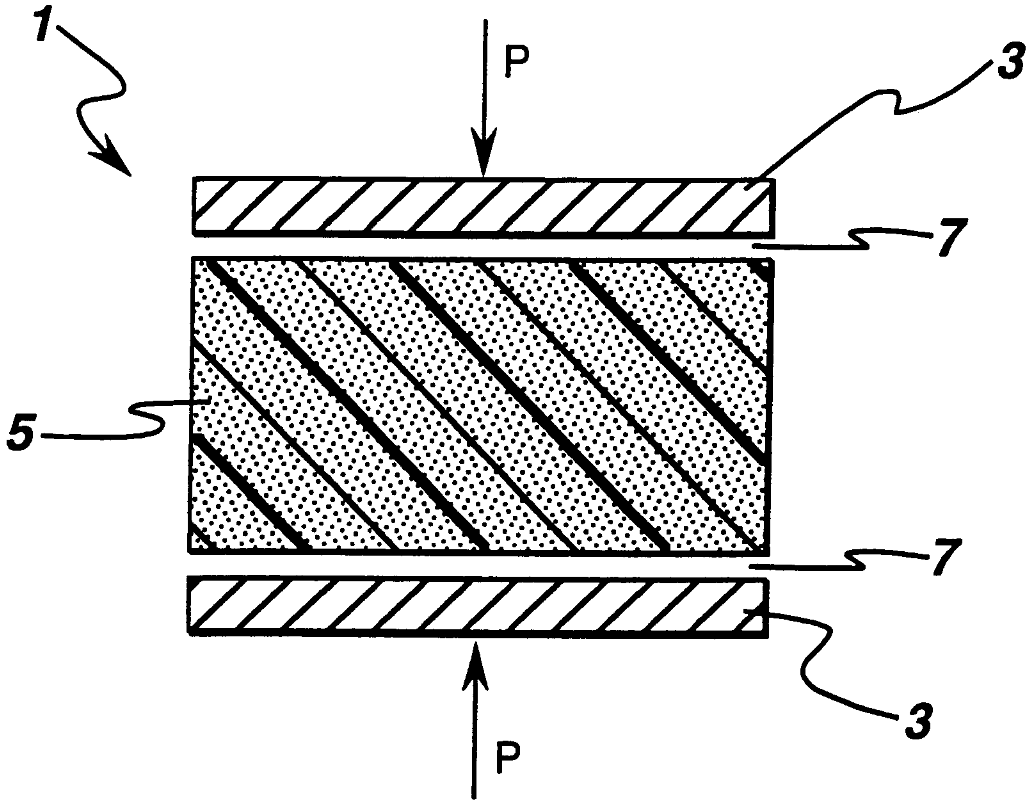
fig. 1 PRIOR ART
FIG. 1 is a schematic representation of a current limiter device, as embodied by the invention.
Figure 2:
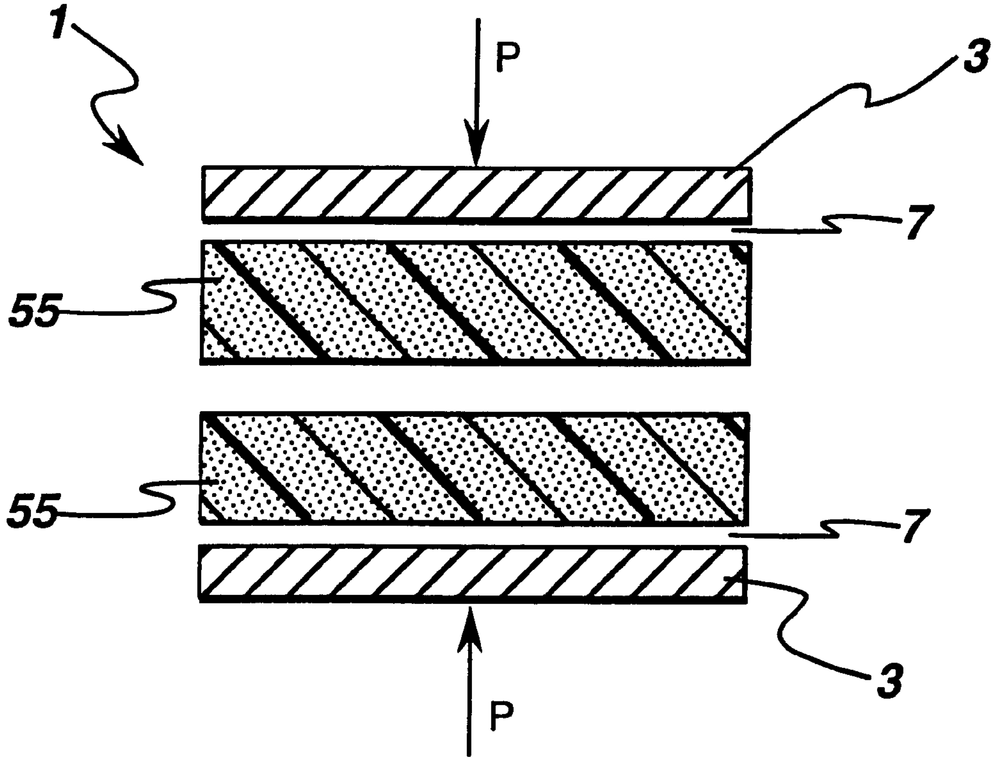
FIG. 2 is a schematic representation of a further current limiter device, as embodied by the invention.

FIG. 1 illustrates a current limiter device, described in U.S. Pat. No. 5,614,881. The current limiter device comprises a high current multiple use fast-acting current limiter device 1. In FIG. 1, the current limiter device 1 described in U.S. Pat. No. 5,614,881, comprises electrodes 3 and an electrically conductive composite material 5 with inhomogeneous distributions 7 of resistance structure under compressive pressure P. However, the scope of the invention includes a high current multiple use current limiter device with any suitable construction where a higher resistance is anywhere between the electrodes 3. For example, the higher resistance may be between two composite materials 55 in the high current multiple use current limiter device, as illustrated in FIG. 2.

To be a reusable current limiter device, the inhomogeneous resistance distribution is arranged so at least one thin layer of the current limiter device is positioned perpendicular to the direction of current flow, and has a higher resistance than the average resistance for an average layer of the same size and orientation in the device. In addition, the current limiter device is under compressive pressure in a direction perpendicular to the selected thin high resistance layer. The compressive pressure may be exerted by a resilient structure, assembly or device, such as but not limited to a spring.

In operation, a current limiter device is placed in the electrical circuit to be protected. During normal operation, the resistance of the current limiter device is low, i.e., in this example the resistance of the current limiter device would be equal to the resistance of the electrically conductive composite material plus the resistance of the electrodes plus the contact resistance. When a high current event or short circuit occurs, a high current density starts to flow through the current limiter device. In initial stages of the short circuit or high current event, the resistive heating of the current limiter device is believed to be adiabatic. Thus, it is believed that at least one thin, more resistive layer of the current limiter device heats up much faster than the remainder of the current limiter device. With a properly designed thin layer, it is believed that the thin layer heats up so quickly that one of thermal expansion of and gas evolution from the thin layer causes a separation within the current limiter device at the thin layer.

As described above, there is a possibility that a build up of moment mechanical stresses occurs in a operation of a current limiter device. The build up of moment mechanical stresses is due, in part to at least one of material ablation and arcing occurring at localized switching regions in the inhomogeneous distribution of resistance structure. The ablation and arcing can lead to high mechanical stresses, which are often in the form of moment mechanical stresses, which are subjected on the conductive composite material. These moment mechanical stresses often lead to the mechanical failure of the composite material. Therefore, electrically conductive composite materials for use in current limiter devices should possess desirable and constant properties and comprise a structure that avoids a build up of moment mechanical stresses.

FIG. 3 illustrates a current limiter device with an interlocked-array of spaced apart discrete elements in an electrically conductive composite material structure 10. The interlocked-array of spaced apart discrete elements in the electrically conductive composite material structure 10 can be used in a current limiter device, as embodied by the invention, to avoid a build up of moment mechanical stresses in a current limiter device. The interlocked-array of spaced apart discrete elements in an electrically conductive composite material structure 10 (hereinafter "interlocked-array conductive interlocked-array conductive composite material structure 10") in FIG. 3 comprises alternating regions of generally macroscopic portions of an insulating flexible material 12 and an electrically conductive electrically conductive composite material 14 to form an interlocked-array conductive interlocked-array conductive composite material structure 10.

The electrically conductive composite material 14 of the interlocked-array conductive composite material structure 10 has a composition similar to that disclosed in U.S. Pat. No. 5,614,881. Accordingly, the electrically conductive composite material 14 comprises a polymer material filled with a conducting filler, and an inhomogeneous distribution of resistance. The electrically conductive composite material 14 comprises a low pyrolysis or vaporization temperature binder and an electrically conducting filler combined with an inhomogeneous distribution of resistance structure. The binder should be chosen such that significant gas evolution occurs at low approximately (<800° C.) temperature. The inhomogeneous distribution structure is typically chosen so that at least one selected thin layer of the current limiter device has much higher resistance than the rest of the current limiter device.

For example, the electrically conductive composite 14 may comprise an elastomer, such as silicone, as the binder material and a metal, such as silver, as the filler material and have a resistivity of about 0.004 ohm-cm. The silver-filled curable silicone material (elastomer) is made, for example, by mixing two parts, A & B. The A part comprises a vinyl silicone organopolysiloxane fluid having terminal dimethylvinylsiloxy units and dimethylsiloxy units with a viscosity of 400 cps at 25° C. (23 g), the following silver particles from Ames Goldsmith Corp. Ag 4300 (46.6 g), Ag 1036 (37.3 g) and Ag 1024 (37.3 g), and a silicone hydride siloxane fluid having terminal trimethyl siloxy units to provide a fluid with about 0.8% by weight chemically combined hydrogen attached to silicon (1 g). The B part comprises vinyl silicone organopolysiloxane fluid having terminal dimethylvinylsiloxy units and dimethylsiloxy units with a viscosity of 400 cps (2 g), dimethyl maleate (14 mL) and Karstedt's platinum catalyst (83 mL of a 5% platinum solution in xylene) [for details see U.S. Pat. No. 3,775,452, B. D. Karstedt (1973)]. The A component (40 g) and B component (0.44 g) are mixed and then poured into a mold, and then cured in a Carver press at 150° C., 30 minutes at 5000 pounds per square inch pressure.

Alternately, the electrically conductive composite material 14 of the interlocked-array conductive composite material structure 10 may comprise a thermoset binder, such as, but not limited to, an epoxy binder (Epoxy-Technology Inc. N30 material) and a metal, such as , but not limited to, nickel powder, as the conducting filler material. When cured at 150° C. for about 1 hour, this material has a resistivity of about 0.02–0.03 ohm-cm.

Further, the electrically conductive composite material 14 of the interlocked-array conductive composite material structure 10 may comprise a thermoset binder, such as, but not limited to, an epoxy binder with a metal filler, such as, but not limited to, silver, as the conducting filler. Such a composite is prepared using silver particles from Ames Goldsmith Corp. Ag 4300 (5.6 g), Ag 1036 (4.2 g), Ag 1024 (4.2 g) and a two component commercial epoxy (Epotek 301) obtained from Epoxy Technology Inc. The epoxy resin (2.3 g) is mixed with the hardener (0.6 g) and then the silver particles are added and the mixture is placed in a Teflon® mold and cured at 60C for 1 hour Another example of an epoxy binder with a metal for the interlocked-array conductive composite material structure 10 comprises a metal, such as, but not limited to, silver can be prepared using Ablebond® 967-1 (Commercial Conducting Adhesive Material from Ablestik Electronic Materials & Adhesives (a subsidiary of National Starch and Chemical Company) placed in a Teflon® mold and cured at 80C for about 2 hours.

Alternately, the electrically conductive composite material 14 for the interlocked-array conductive composite material structure 10 may comprise an elastomer binder, such as, but not limited to, a silicone binder with a two component metal conducting filler, such as, but not limited to, silver and aluminum, as the conducting filler. This composition is prepared by mixing two parts, A and B. The A part comprises a vinyl silicone organopolysiloxane fluid having terminal dimethylvinylsiloxy units and dimethylsiloxy units (400 cps, 23 g), 37.3 g of aluminum powder, silver particles from Ames Goldsmith Corp. Ag 4300 (46.6 g), Ag 1036 (37.3 g) and Ag 1024 (37.3 g), and a silicone hydride siloxane fluid having terminal trimethyl siloxy units to provide a fluid with about 0.8% by weight chemically combined hydrogen attached to silicon (1 g). The B part comprises vinyl silicone organopolysiloxane fluid having terminal dimethylvinylsiloxy units and dimethylsiloxy units with a viscosity of 400 cps (2 g), dimethyl maleate (14 mL) and Karstedt's platinum catalyst (83 mL of a 5% platinum solution in xylene). The A component (40 g) and B component (0.44 g) are mixed and then poured into a mold and then cured in a Carver press at about 150° C. for about 30 minutes at about 5000 pounds per square inch pressure.

As a further alternative, the electrically conductive composite material 14 of the interlocked-array conductive composite material structure 10 may comprise an elastomer binder, such as, but not limited to, a silver-filled, curable silicone is made from two parts, A and B. The A part comprises a vinyl silicone organopolysiloxane fluid having terminal dimethylvinylsiloxy units and dimethylsiloxy units (400 cps, 33 g), silver particles from Ames Goldsmith Corp. Ag 4300 (46.6 g), Ag 1036 (37.3 g) and Ag 1024 (37.3 g), alpha quartz (Minusil, 23 g) and a silicone hydride siloxane fluid having terminal trimethyl siloxy units to provide a fluid with about 0.8% by weight chemically combined hydrogen attached to silicon (2 g). The B part comprises vinyl silicone organopolysiloxane fluid having terminal dimethylvinylsiloxy units and dimethylsiloxy units with a viscosity of 400 cps (10 g), dimethyl maleate (70 mL) and Karstedt's platinum catalyst, as mentioned above (415 mL of a 5% platinum solution in xylene). The A component (40 g) and B component (0.5 g) are mixed and then poured into a mold and then cured in a Carver press at about 150° C. for about 30 minutes at about 5000pounds per square inch pressure.

In a still further alternative, the electrically conductive composite material 14, which can be used in the interlocked-array conductive composite material structure 10, as embodied by the invention, may comprise a reinforced elastomer binder, such as, but not limited to, a curable silicone reinforced with fumed silica, with a two component metal filler, such as, but not limited to, silver and aluminum is made with an A part and a B part. The A part comprises an elastomer binder, such as, but not limited to, a vinyl silicone organopolysiloxane fluid having terminal dimethylvinylsiloxy units and dimethylsiloxy units (400 cps, 23 g), a silicone hydride siloxane fluid having terminal trimethyl siloxy units to provide a fluid with about 0.8% by weight chemically combined hydrogen attached to silicon (2 g), doubly treated fumed silica (300 $m^2/g$, treated with cyclooctamethyltetrasiloxane and with hexamethyldisilazane, 1.2 g), aluminum powder (37.3 g), silver particles from Ames Goldsmith Corp. Ag 4300 (46.6 g), Ag 1036 (37.3 g), Ag 1024 (37.3 g). The B part comprises the vinyl silicone organopolysiloxane fluid having terminal dimethylvinylsiloxy units and dimethylsiloxy units (400 cps, 2 g), dimethylmaleate (14 mL) and Karstedt's platinum catalyst (83 mL). A curable formulation is prepared by combining the A part (40 g) and the B part (0.44 g) and then hand mixing and placing in a mold. Cure is accomplished in a Carver press at 5000 pounds per square inch pressure and 150° C. for 30 min.

In another alternative for the electrically conductive composite material 14, as embodied by the invention, an elastomer binder, such as, but not limited to, a nickel filled silicone, is made from two parts, A and B. The A part comprises a vinyl silicone organopolysiloxane fluid having terminal dimethylvinylsiloxy units and dimethylsiloxy units (400 cps, 25 g), nickel powder (INCO type 123, 100 g) and a silicone hydride siloxane fluid having terminal trimethyl siloxy units to provide a fluid with about 0.8% by weight chemically combined hydrogen attached to silicon (2 g). The B part comprises the vinyl silicone organopolysiloxane fluid having terminal dimethylvinylsiloxy units and dimethylsiloxy units with a viscosity of 400 cps (10 g), dimethyl maleate (70 mL) and Karstedt's platinum catalyst (415 mL of a 5% platinum solution in xylene). The A component (40 g) and B component (0.5 g) are mixed and then poured into a mold and then cured in a Carver press at 150° C., 30 minutes at 5000 pounds per square inch pressure.

In a further alternative the electrically conductive composite material 14 for an interlocked-array conductive composite material structure 10, as embodied by the invention, may comprise thermoplastic binder, such as, but not limited to, polytetrafluoroethylene binder, with a semiconductor conducting filler, such as Carbon Black. An example of this material is GS-2100-080-5000-SC (Commercial Conductive Fluoropolymer from W. L. Gore & Associates, Inc.).

In still another alternative, the electrically conductive composite material 14 may comprise a thermoplastic binder, such as, but not limited to, poly(ethylene glycol) with a metal filler, such as, but not limited to, silver, as the conducting filler. A silver particle mixture comprising the following particles from Ames Goldsmith Corp., Ag 4300 (2.8 g), Ag 1036 (2.1 g), Ag 1024 (2.1 g) is heated to about 80C and poured into molten Poly(ethyleneglycol) (MW8000) at about 80° C. and mixed. The material is then poured into a Teflon® mold and allowed to harden at room temperature.

A binder material having a low pyrolysis or vaporization temperature (<800° C.) such as, but not limited to, a thermoplastic (for example, polytetrafluoroethylene, poly (ethyleneglycol), polyethylene, polycarbonate, polyimide, polyamide, polymethylmethacrylate, polyester etc.); a thermoset plastic (for example, epoxy, polyester, polyurethane, phenolic, alkyd); an elastomer (for example, silicone polyorganosiloxane, polyurethane, isoprene rubber, neoprene, etc.); an organic or inorganic crystal; combined with an electrically conducting filler such as a metal (for example, nickel, silver, copper, etc.) or a semiconductor (for example, carbon black, titanium dioxide, etc.) with a particulate or foam structure. Also, these materials may be combined with a metal or semiconductor electrode pressure contacted to the electrically conducting composite material, could also perform effectively in the current limiter, as embodied by the invention.

Third phase fillers could be used to improve specific properties of the composite such as the mechanical properties; dielectric properties; or to provide arc-quenching properties or flame-retardant properties. Materials which could be used as a third phase filler in the composite material include, but not limited to: a filler selected from reinforcing fillers such as fumed silica, or extending fillers such as, but not limited to, precipitated silica and mixtures thereof. Other fillers include, but are not limited to, titanium dioxide, lithopone, zinc oxide, diatomaceous silicate, silica aerogel, iron oxide, diatomaceous earth, calcium carbonate, silazane treated silicas, silicone treated silicas, glass fibers, magnesium oxide, chromic oxide, zirconium oxide, alpha-quartz, calcined clay, carbon, graphite, cork, cotton, sodium bicarbonate, boric acid, and alumina-hydrate. Other additives may include: impact modifiers for preventing damage to the current limiter such as cracking upon sudden impact; flame retardant for preventing flame formation and/or inhibiting flame formation in the current limiter; dyes and colorants for providing specific color components in response to customer requirements; UV screens for preventing reduction in component physical properties due to exposure to sunlight or other forms of UV radiation.

As illustrated in FIG. 3, interlocked-array conductive composite material structure 10, as embodied by the invention, comprises an insulating flexible material 12, which is typically provided in relatively large, generally macroscopic portions. The insulating flexible material 12 comprises a plurality of generally equispaced generally parallel segments or strips 13. The strips 13 are illustrated in FIG. 3 to intersect at generally orthogonal angles, so as to define generally rectangular pieces 15, here square, of generally macroscopic amounts of electrically conductive composite material 14 to define the interlocked-array conductive composite material structure 10. However, the generally rectangular geometrical configuration illustrated in FIG. 3 is merely exemplary of the numerous geometrical configurations to form the interlocked-array conductive composite material structure 10 within the scope of the invention. As discussed hereinafter, the invention contemplates an interlocked-array conductive composite material structure 10 with any geometrical configuration of electrically conductive composite material 14 and insulating flexible material 12.

FIG. 4 illustrates a partial side sectional view of an interlocked-array conductive composite material structure 10, as embodied by the invention, in which the insulating flexible material 12 is in section and the electrically conductive composite material 14 is illustrated in plane view for ease of illustration. The insulating flexible material 12 is positioned between the generally rectangular pieces 15 of the electrically conductive composite material 14. The electrically conductive composite material 14 extends above the insulating flexible material 12 at both upper and lower portions of the interlocked-array conductive composite material structure 10. As described below, the altitude of the electrically conductive composite material 14 is a result of a process used to form the interlocked-array conductive composite material structure 10 (described hereinafter). The interlocked-array conductive composite material structure 10 may have the insulating flexible material 12 positioned between pieces of the electrically conductive composite material 14 at any appropriate altitude with respect to the electrically conductive composite material 14, as long as the interlocked-array conductive composite material structure 10 reduces a build up of moment mechanical stresses.

A current limiter device 20 incorporating the interlocked-array conductive composite material structure 10, as embodied by the invention, is illustrated in FIG. 5 (a partial sectional illustration similar to FIG. 4). In FIG. 5, the current limiter device 20 comprises electrodes 23 and an electrically conductive interlocked-array conductive composite material structure 10, as embodied by the invention. Inhomogeneous distributions (not illustrated but similar to those described in U.S. Pat. No. 5,614,881) of resistance structure are included, and the current limiter device 20 is under compressive pressure P. However, the scope of the invention includes a high current multiple use current limiter device with appropriate and suitable construction, in which a higher resistance is disposed between the electrodes 23.

The advantages of electrically conductive interlocked-array conductive composite material structure 10, as embodied by the invention arise, at least in part, due to an increased and enhanced flexibility of the electrically conductive interlocked-array conductive composite material structure 10. The increased flexibility is imparted by the flexible material regions defined by the insulating flexible material 12. The enhanced and increased flexibility is advantageous, for example, when a switching event occurs. During a switching event, many different localized ablation events occur in the current limiter device 20. These localized ablation events cause a distribution of localized stresses over the interlocked-array conductive composite material structure 10. If relatively wide area electrodes are used in the current limiter device 20, large lever moments on the interlocked-array conductive composite material structure 10 in the current limiter device 20 may occur during switching. These large lever moments often result in material fracture of the interlocked-array conductive composite material structure 10. With the interlocked-array conductive composite material structure 10, as embodied by the invention, large lever moment stresses are avoided and do not build up because there are at least one, and preferably a plurality of, regions of insulating flexible material 12. The regions of insulating flexible material 12 are interspersed between stress points, which are also separated by a relatively large distance. These regions of insulating flexible material 12 permit displacement of the interlocked-array conductive composite material structure 10. The displacement of the interlocked-array conductive composite material structure 10 relieves stresses that build up during switching.

The insulating flexible material 12 is formed of a flexible material, such as but not limited to, both natural and synthetic rubbery materials, such as for example, a silicone rubber, an elastomer, such as, but not limited to, silicone polyorganosiloxane, polyurethane, isoprene rubber, and neoprene. The rubbery materials of the insulating flexible material 12 have a sufficient dielectric strength to prevent an arc from striking directly between the two electrodes 23. In order to prevent an arc, the insulating flexible material 12 is also in close physical contact with the surrounding electrically conductive composite material 14. Alternately, the insulating flexible material 12 can be adhered to the surrounding electrically conductive composite material 14. Further, it may be alternately desirable to add a predetermined quantity of fillers to the insulating flexible material 12. The addition of fillers can enhance the dielectric strength or thermal conductivity of the insulating flexible material 12 and the resulting flexible regions.

Spacing between the flexible regions of the insulating flexible material 12 may be dependent on design, ultimate intended use and environmental factors, such as for example a desired fracture toughness and thickness of the electrically conducting electrically conductive composite material 14 utilized in a current limiter device 20. Also, spacing between the flexible regions of the insulating flexible material 12 may depend on the ultimate intended use and environment of the current limiter device 20. In general, a less tough and thinner electrically conducting electrically conductive composite material 14 may require a smaller distance between flexible regions of the insulating flexible material 12, than would a tougher and thicker electrically conducting electrically conductive composite material 14.

Figure 6:
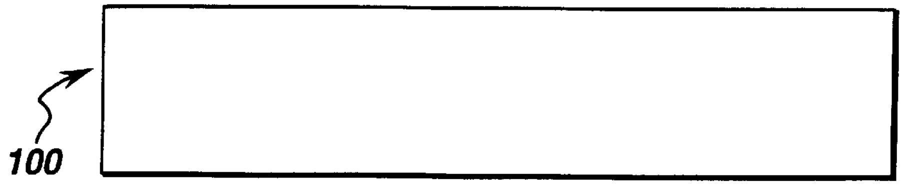
FIGS. 6–9 are partial side sectional views of a method of forming a composite material structure for a current limiter device, as embodied by the invention.
Figure 8:
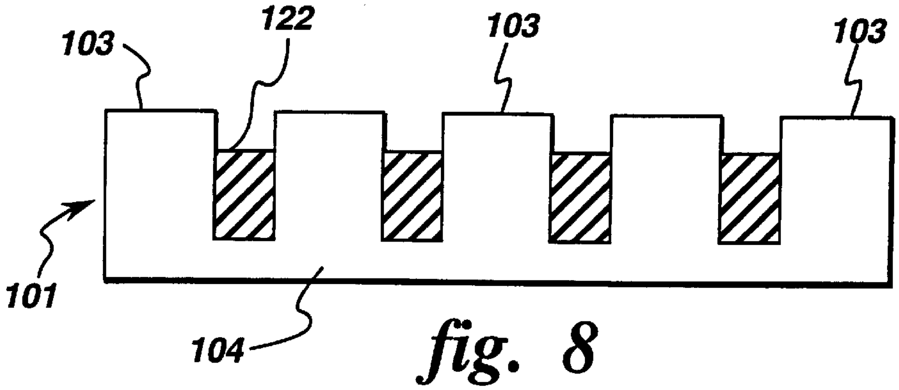
Figure 9:
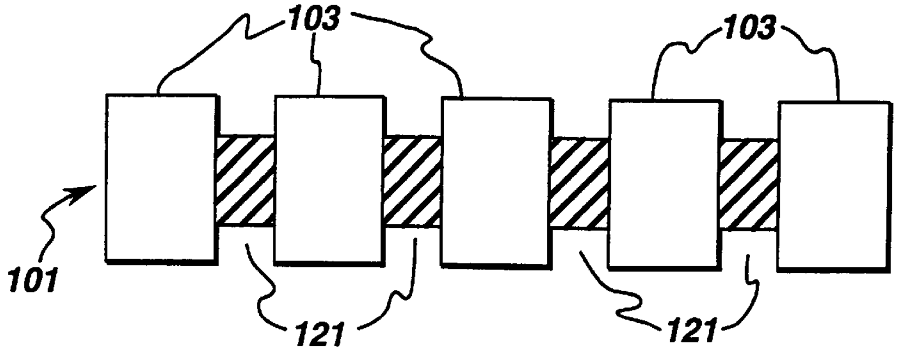
Figure 10:
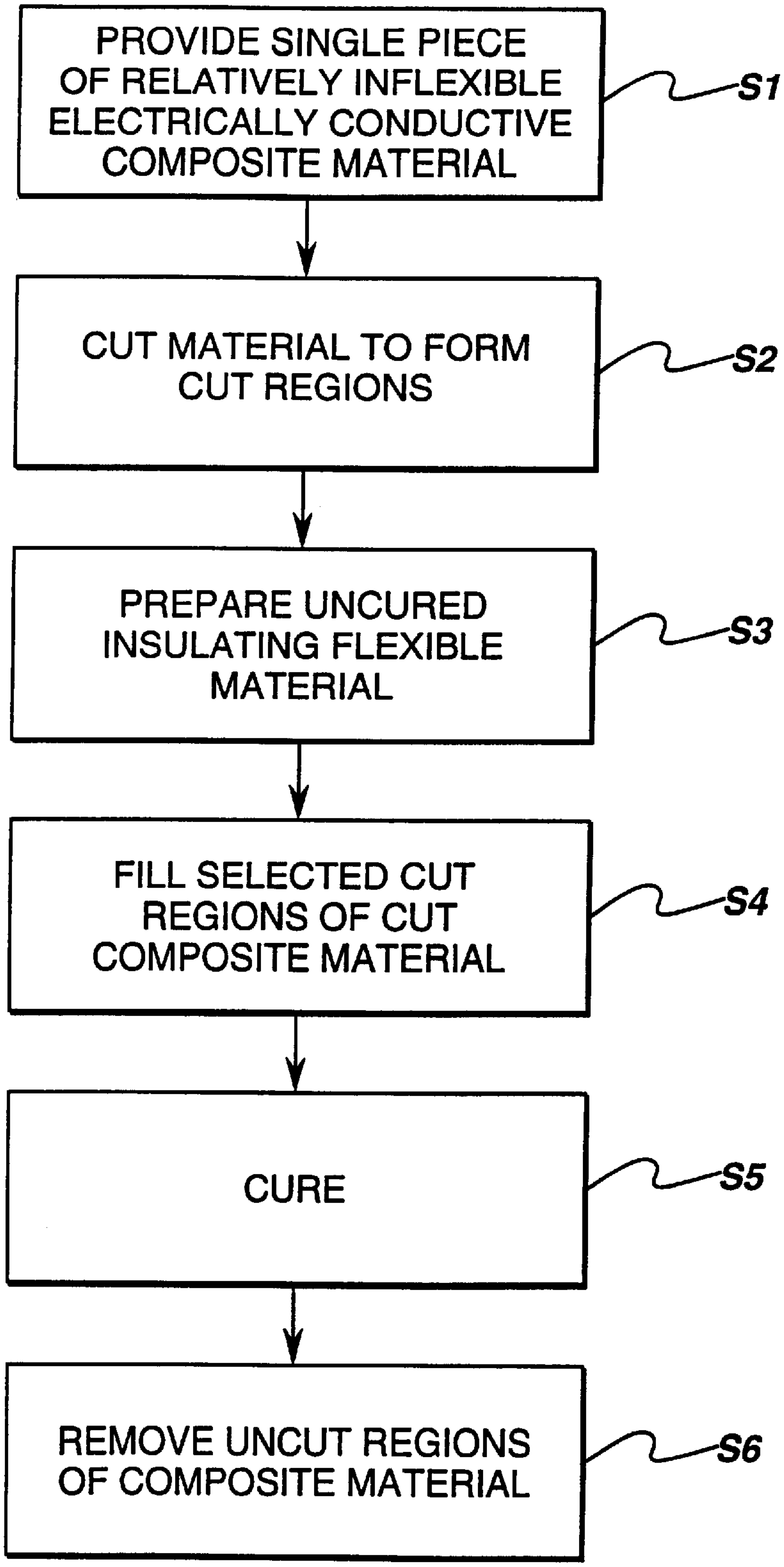
FIG. 10 is a flow chart illustrating the steps in the method of forming in FIGS. 6*a*–6*d*.

FIGS. 6–9 illustrate one method, as embodied by the invention, for fabricating an interlocked-array conductive composite material structure 10. FIG. 10 is a flow chart illustrating the steps illustrated in FIGS. 6–9. Reference characters that are distinct from others are used in FIG. 10 to clarify the formation aspects. In step S1, a single piece of a relatively inflexible electrically conductive composite material 100, illustrated in FIG. 6, is provided to form the interlocked-array conductive composite material structure 10.

Figure 7:
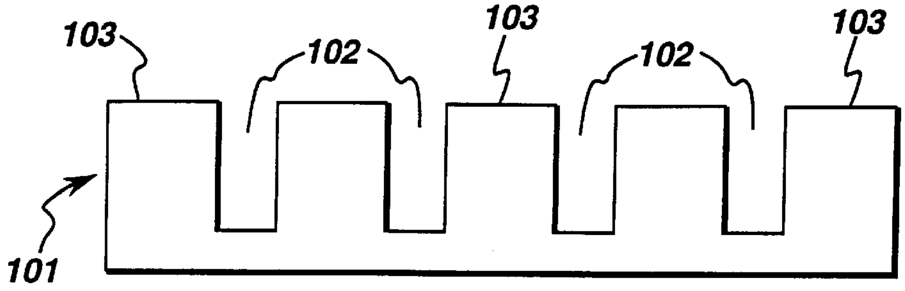

In step S2, the single piece of a relatively inflexible electrically conductive composite material 100 is cut with an appropriate cutting tool, for example, but not limited to, a dicing saw. The relatively inflexible electrically conductive composite material 100 is cut to form depressions, otherwise known as, cut regions 102. The cut regions 102 are formed on a cut side 103 of the relatively inflexible electrically conductive composite material 100 to form the segments, otherwise known as strips, with an appropriate pattern for a desired final interlocked-array conductive composite material structure 10. The cut relatively inflexible electrically conductive composite material 100 is illustrated in FIG. 7. The cut relatively inflexible electrically conductive composite material 100 comprises an un-cut side 104, which is opposite openings of the cut regions 102 of the cut relatively inflexible electrically conductive composite material 100.

An uncured insulating flexible material 121 is prepared in step S3. Selected cut regions 102 of the cut relatively inflexible electrically conductive composite material 100 are then filled with the uncured insulating flexible material 121, as illustrated in FIG. 8, in step S4. The uncured insulating flexible material 121 can be any appropriate uncured material that will form an insulating flexible material 12, as embodied by the invention, when cured. For example, the uncured insulating flexible material 121 may comprise uncured silicone liquid.

The uncured insulating flexible material 121 in the selected cut regions 102 of the cut relatively inflexible electrically conductive composite material 100 is then cured into a flexible solid cured insulating material 121, in step S5. The cured insulating material 121 will shrink, to a certain degree, and its top level 122 will be below a top level of the cut side 103 of the cut relatively inflexible electrically conductive composite material 100. The cut relatively inflexible electrically conductive composite material 100 is then machined, cut or otherwise shaped in step S6 to remove portions of the originally un-cut side 104, which are opposite openings of the cut regions 102 of the cut relatively inflexible electrically conductive composite material 100. Thus, the flexible solid cured insulating material 121 is exposed from both sides of the cut relatively inflexible electrically conductive composite material 100, without extending to the sides, as illustrated in FIG. 9. Thus, the resultant structure formed according to the above-described method, as embodied by the invention, forms an interlocked-array conductive composite material structure 10.

If step S6 is omitted, the interlocked-array conductive composite material structure 10 will possess enhanced fracture toughness. The enhanced fracture toughness is due in part to the flexible solid cured insulating material 121 in the flexible solid cured insulating material 121, which still provides a suitable degree of flexibility.

As discussed above, the geometrical shape and configuration of an interlocked-array conductive composite material structure 10 as illustrated in FIG. 3, is merely exemplary of the numerous geometrical interlocked-array conductive composite material structure configurations within the scope of the invention. The scope of the invention comprises interlocked-array conductive composite material structure 10 with any geometrical configuration of electrically conductive composite material 14 and insulating flexible material 12.

Figure 11:
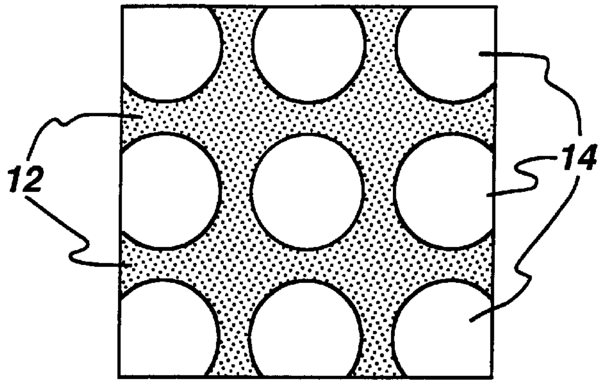
FIGS. 11–13 are top perspective views of composite material structures for a current limiter device, as embodied by the invention.
Figure 12:
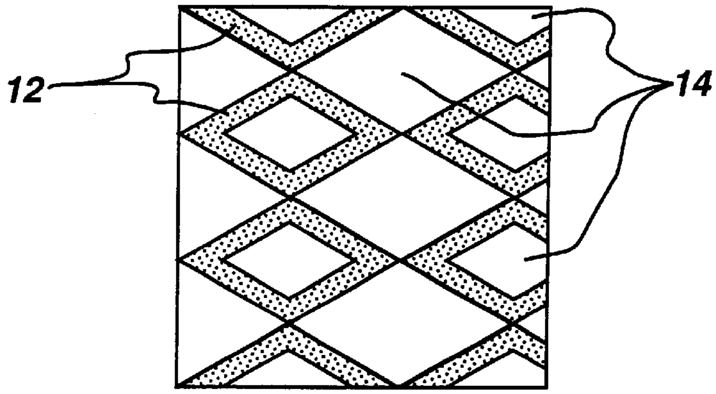
Figure 13:
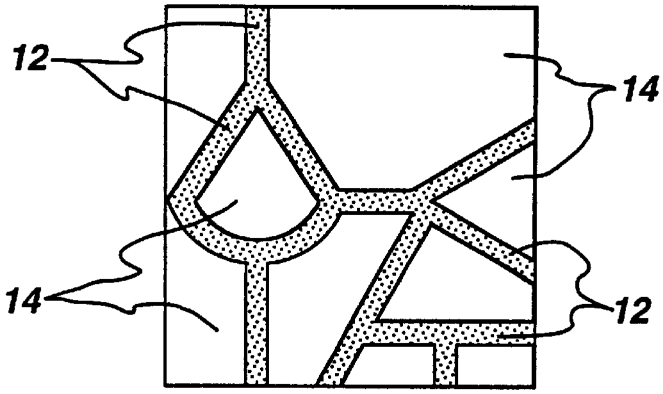

FIGS. 11–13 illustrate several geometrical configuration of interlocked-array conductive composite material structure 10. In FIG. 11, the interlocked-array conductive composite material structure 10 comprises arcuate geometrical configurations of electrically conductive composite material 14 and insulating flexible material 12. FIG. 12 illustrates the interlocked-array conductive composite material structure 10 comprising triangular geometrical configurations of electrically conductive composite material 14 and insulating flexible material 12. Further, FIG. 13 illustrates a mixed geometrical interlocked-array conductive composite material structure 10 comprising electrically conductive composite material 14 and insulating flexible material 12. As stated above, these are merely exemplary interlocked-array conductive composite material structures and are not intended to limit the invention in any manner.

It is believed that the advantageous results of the invention are obtained because, during a high current event, adiabatic resistive heating of the thin layer lends to rapid thermal expansion and gas evolution from the binding material in the high current multiple use current limiter device. This rapid thermal expansion and gas evolution lead to a partial or complete physical separation of the current limiter device at the selected thin layer, and produce a higher over-all device resistance to electric current flow. Therefore, the current limiter device limits the flow of current through the current path. When the high current event is cleared externally, it is believed that the current limiter device regains its low resistance state due to the compressive pressure built into the current limiter device allowing thereby electrical current to flow normally. The current limiter device, as embodied by the invention, is reusable for many such high current event conditions, depending upon such factors, among others, as the severity and duration of each high current event.

In a current limiter device, as embodied by the invention, it is believed that the vaporization and/or ablation of the composite material causes a partial or complete physical separation at the area of high resistance, for example the electrode/material interface. In this separated state, it is believed that ablation of the composite material occurs and arcing between the separated layers of the current limiter device can occur. However, the overall resistance in the separated state is much higher than in the non-separated state. This high arc resistance is believed due to the high pressure generated at the interface by the gas evolution from the composite binder combined with the deionizing properties of the gas. In any event, the current limiter device of the present invention is effective in limiting the high current event current so that the other components of the circuit are not harmed by the high current event.

After the high current event is interrupted, it is believed that the current limiter device returns or reforms into its non-separated state, due to compressive pressure, which acts to push the separated layers together. It is believed that once the layers of the current limiter device have returned to the non-separated state or the low resistance state, the current limiter device is fully operational for future current-limiting operations in response to other high current event conductors.

Alternate embodiments of the current limiter device of the present invention can be made by employing a parallel current path containing a resistor, varistor, or other linear or nonlinear elements to achieve goals such as controlling the maximum voltage that may appear across the current limiter device in a particular circuit or to provide an alternative path for some of the circuit energy in order to increase the usable lifetime of the current limiter device.

While the embodiments described herein are preferred, it will be appreciated from the specification that various combinations of elements, variations or improvements therein may be made by those skilled in the art that are within the scope of the invention.

What is claimed is:

1. A current limiter device comprising:

at least two electrodes;

a composite array structure which comprises a plurality of discrete elements of at least one electrically conductive composite material and regions of at least one insulating flexible material, said plurality of discrete elements of at least one electrically composite material being attached together by said regions of at least one insulating flexible material to form said composite array structure, each of said plurality of said discrete elements being in direct contact with at least one of said regions of at least one insulating flexible material, said discrete elements of at least one electrically conductive composite material and said regions of at least one insulating flexible material being disposed in substantially parallel relationship in a direction of current flow, said regions of at least one insulating flexible material having a smaller thickness than that of said discrete elements of at least one electrically conductive composite material such that said regions of at least one insulating material are spaced apart from at least one of said electrodes, said composite array structure being disposed between the electrodes to define interfaces therebetween;

an inhomogeneous distribution of resistance at the interfaces whereby, during a high current event, adiabatic resistive heating at the interfaces causes rapid thermal expansion and vaporization of a component of said electrically conductive composite material and physical separation at at least one of the interfaces, thereby limiting a flow of said high current; and means for exerting compressive pressure on the electrically conducting composite material;

wherein said thicknesses of said regions and of said discrete elements are measured in a plane and in direction parallel to a plane of said compressive pressure and wherein at least one surface of said regions of at least one insulating flexible material perpendicular to said plane of said compressive pressure is free from a direct application of said compressive pressure.

2. The device according to claim 1, wherein the at least one electrically conductive composite material comprises a polymer material filled with an electrically conducting filler.

3. The device according to claim 1, wherein the at least one insulating flexible material comprises at least one of natural and synthetic rubbers.

4. The device according to claim 1, wherein the at least one insulating flexible material in the array structure comprises at least one material selected from the group consisting of:

silicone rubber; elastomers; polyorganosiloxanes; polyurethane; isoprene rubber; neoprene; and combinations thereof.

5. The device according to claim 1, wherein the at least one insulating flexible material in the array structure comprises fillers that enhance thermal conductivity of the insulating flexible material.

6. The device according to claim 1, wherein said regions of at least one insulating flexible material form a continuous discrete region.

7. The device according to claim 1, wherein at least one of said plurality of discrete elements of at least one electrically conductive composite material is attachably surrounded by said regions of said at least one insulating flexible material.

8. The device according to claim 1, wherein the at least one insulating flexible material in the array structure is in contact with surrounding discrete elements of at least one electrically conductive composite material.

9. The device according to claim 1, wherein the regions of at least one insulating flexible material comprise intersecting strips and segments.

10. The device according to claim 1, wherein the regions of at least one insulating flexible material comprise arcuate strips and segments of insulating flexible material.

11. The device according to claim 1, wherein the regions of at least one insulating flexible material comprise strips and segments forming a triangular shape.

12. The device according to claim 1, wherein the regions of at least one insulating flexible material comprise strips and segments forming a polygonal shape.

13. The device according to claim 1, wherein the regions of at least one insulating flexible material comprise at least one shape selecting from the group consisting of intersecting strips and segments, strips and segments that have an arcuate shape, strips and segments that form a polygonal shape, and combinations thereof.

14. The device according to claim 1, wherein the compressive pressure exerted by the exerting means is applied generally in a direction parallel to current flow.

15. The device according to claim 1, wherein during a high current event, adiabatic resistive heating is followed by rapid thermal expansion and vaporization of a component of said electrically conductive composite material, the thermal expansion and vaporization being followed by at least a partial physical separation of the array structure from the at least one electrode.

16. The device according to claim 1, wherein the overall resistance of the device in the partially or completely separated state is much higher than in the non-separated state so that the current limiter device is effective in limiting a high current event.

17. The device according to claim 1, wherein upon elimination of the high current event, the exerting means exerts pressure sufficient such that the device returns to the low resistive state.

18. The device according to claim 1, wherein during a high current event, a higher overall device resistance to electric current flow is produced to limit a flow of the high current.

19. The device according to claim 1 wherein said regions of at least one insulating flexible material are distinct from said discrete elements of at least one electrically conductive composite material.

* * * * *